Patented Nov. 17, 1936

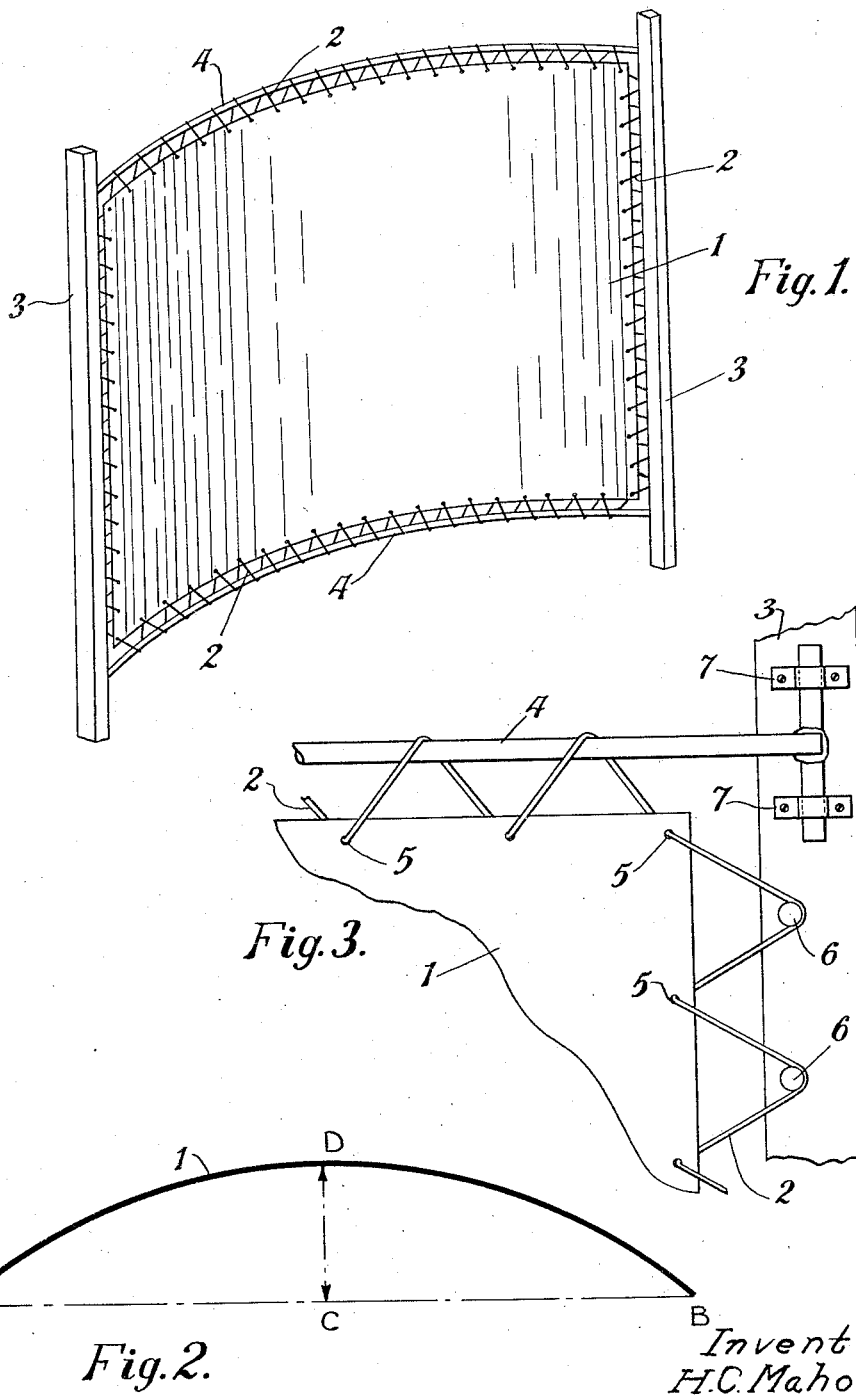

2,060,817

UNITED STATES PATENT OFFICE 2,060,817

SCREEN FOR OPTICAL PROJECTIONS

Henry Charles Mahoney, Thornton Heath, England

Application July 21, 1933, Serial No. 681,629
In Great Britain July 27, 1932

5 Claims. (Cl. 88—24)

This invention relates to screens for optical projection purposes, more particularly projection screens for use in connection with kinematograph projectors associated or not with sound reproducing apparatus, and also for use with television and similar apparatus.

Projection screens as at present employed in kinematograph theatres are flat, and are almost invariably bounded by a black mask or border. This detracts from the "atmosphere" pertaining to the ordinary theatre, in which the performance is presented by living characters.

The impression created by a kinematograph picture projected on to a flat screen, particularly where it is bordered or framed is that of viewing a picture as such, in contradistinction to living characters performing on a stage as in the ordinary theatre, and frequenters of the kinematograph theatre habitually anticipate and regard the kinematograph representation merely as a picture.

This mere picture effect of the usual kinematographic representation is augmented by the lack of depth in the projected picture.

Moreover, when the picture is viewed from a position close to the screen or from the side, considerable distortion is noticeable, and eye-strain frequently results.

This also involves to some extent a loss in the profitable seating capacity of the kinematograph theatre for the reason that spaces close to the screen but at the sides, which would normally be occupied by seats, are frequently not so accommodated, as seats in these positions would be avoided owing to the distorted effect of the picture when viewed from an acute angle.

One of the objects of the invention is to provide a screen which gives to the projected picture the effect of depth and solidity simulating a stereoscopic effect, without necessitating, in the case of a kinematograph projector, for example, the use of a special projector, double projectors with duplicate films, or alterations to an existing projector.

Another object of the invention is to provide a screen which avoids or reduces the distorted view of the projected picture obtained from positions close to and at the sides of the screen, thereby removing or reducing the disadvantages incidental thereto.

It is found that these objects are attainable by projecting the picture on to a screen of curved formation, the curvature being scientifically proportioned.

In order that the principles on which the invention is based may be more readily appreciated, it may here be mentioned that when viewing a picture projected on a flat screen, the middle portion of the picture is common to and focussed by both eyes of the observer, while the extreme left and extreme right hand portions of the picture are seen only with the left eye and the right eye respectively and out of focus, unless the eyes are turned to the right or left and axially accommodated to bring the left or right portion of the picture into focus, in which case the portion of the picture so focussed is viewed obliquely, with resulting eye strain.

The curved screen according to my invention is scientifically proportioned in curvature in relation to its width and according to the throw of the picture, to coincide with the normal field of vision of the human eye and to bring the extreme left and right portions of the projected picture into focus with the eyes of the observer, so creating in the picture the effect of solidity and depth, the screen, by reason of its curved extremities, presenting the right and left hand portions of the picture at a normal to the eye, even when the eyes are turned to the right or left, eye-strain and any impression of distortion being thus avoided, irrespective of the position from which the picture is viewed by the observer.

A laterally curved screen, that is to say, one which curves from side to side, forming, in effect, a section of a vertically arranged hollow cylinder with the concave surface facing the observer, is found, by experiment, to be the most satisfactory for the purpose.

With such a screen, the tendency is for the eye of the observer normally to be attracted to the centre of the screen, but in travelling from the centre to either side, such side parts of the screen, by reason of their curvature, more closely approach normality to the eye than in the case of a flat screen, thereby avoiding or considerably reducing the distorted view of the picture obtained when viewed at an angle, or from the side of the screeen, and preventing eye-strain which is so frequently a concomitant of flat screen projection.

A curved screen according to the invention is intended for use also in connection with television and other apparatus for reproducing animated pictures, in which the effect of depth and solidity is desired.

With a screen according to the invention, masking may be omitted or reduced to the minimum.

The screen may form a surround for the stage or part thereof, its top being concealed by a pelmet and curtains or drapery hung from the proscenium, and side wings being introduced, if desired.

Under such conditions and with the effect of depth and solidity imparted by the curvature of the screen, the characters more closely approach living characters performing directly on the stage, and the impression inherently associated by the observer with kinematograph displays, of viewing merely a flat picture in a frame, is removed, and the observer is enabled to enter into the "atmosphere" of the scene portrayed.

In the drawing:—

Figure 1 illustrates diagrammatically, one embodiment of the screen according to the invention and its supporting means, in perspective, viewed from the front.

Figure 2 is a top edge view of this embodiment of the screen apart from its supports, this figure serving to illustrate clearly the curvature of the screen; and Figure 3 shows, in elevation, part of this embodiment of the screen and the means for supporting it, on a larger scale.

In the embodiment illustrated, 1 indicates the screen which is curved laterally, so that it presents a section of a vertically arranged hollow cylinder, the concave surface facing the observer.

The picture may be projected on to the front or rear face of the screen.

The screen 1 may be constructed of textile material such as canvas, or linen, the viewing surface or both surfaces being suitably prepared in any customary manner.

With the projector arranged at an average distance from the screen, for projection of the picture on to the concave face thereof, taking as a basis of this distance that usually selected in kinematograph theatres it is found that the purpose of the invention is satisfactorily achieved if the depth C—D at the middle of the bow or curve, measured at the top or bottom of the screen, lies between 1/6 and 1/5 of the distance A—B between the side edges of the screen. For example, if the screen has a dimension A—B of the order of 19 feet, the depth C—D is of the order of 3 feet 6 inches, that is to say, a ratio of the order of 5.4 insures a satisfactory result.

The measurement should be made at the top or bottom of the screen, as, in practice, when the screen is made of textile fabric stretched between laterally curved supports, as hereinafter described, a certain amount of different curvature occurs at the middle section in a direction from top to bottom, the amount of such different curvature varying with the tension of the screen and may be referred to as forward bellying.

This forward bellying of the screen at the middle enhances the effect of solidity in the projected picture, since the picture is focussed by the operator on to this middle portion, the other parts of the picture being out of focus but so slightly as to be unnoticeable, but nevertheless affording a slight vision that gives the impression of depth.

The screen 1 may be supported in any suitable manner.

In the present embodiment, it is supported by lacings 2, in a frame comprising two upright beams 3 of wood connected by curved tubes or rods 4 of metal.

The lacings 2 are passed through holes 5 formed in the screen adjacent to its edges.

The lacings 2 at the top and bottom edges of the screen 1 are looped about the tubes or rods 4, while those at the sides of the screen are looped about studs 6 fixed to the beams 3.

By this method of supporting the screen, it can be readily tautened and brought to the correct curvature determined by the curved tubes or rods 4.

As shown in Figure 3, the curved tubes or rods 4 may be secured to the beams 3 by clips 7, engaging over cross bars or tubes of short length, 10 welded to the curved tubes or bars 4 at the ends.

In the case of small screens, such as those employed with domestic television apparatus, or in connection with toy or home cinematograph projectors, they may, advantageously, be made of sheet metal, such as aluminium, bent to the required curvature.

The larger types of screen for public exhibitions may similarly be made of sheet metal, if desired, although it is more economical to adopt textile fabric for their manufacture.

It is to be understood that the invention is not restricted to the particular form of construction illustrated by the drawing, as this is given merely by way of example of one embodiment of the invention and is capable of variation and modification, without departing from the invention as defined by the appended claims.

The lateral curvature assumed by the screen when suspended from the curved rod 4, may be one which is not continuous or smooth but which merges into a middle section of different curvature, the screen when manufactured of rigid material having, if desired, a corresponding varying curvature.

I claim:

1. An optical projection screen comprising a frame made up of rigid, substantially rectilinear parallel uprights, cross bars of rigid form secured terminally to the uprights, the cross bars being curved longitudinally and in the horizontal plane, with the curvature of the one corresponding to the curvature of the other, a screen proper of woven flexible fabric material having vertical and transverse dimensions less than those of the frame formed by the uprights and cross bars and connectors uniting the edges of the screen proper to the uprights and to the cross bars, said connectors permitting the tensioning of the screen in all directions, and mounting said screen for accommodation to the tensioning in all directions.

2. In a projection screen, a projection surface having the curvature resulting from mounting and tensioning in all directions, a canvas or textile fabric upon a frame made up of rigid rectilinear parallel uprights, cross bars of rigid form secured terminally to the uprights, the cross bars being curved longitudinally and in the horizontal plane with the curvature of the one corresponding to the curvature of the other and having vertical and transverse dimensions less than those of the frame formed by the uprights and cross bars and connectors uniting the edges of the screen to the uprights and to the cross bars, said connectors permitting the tensioning of the fabric and the accommodation of the same to the tensioning in all directions.

3. As an optical projection screen having an image receiving area comprising a single continuously curved surface, the traces of which are concave in one direction and convex in a second direction normal to said first direction.

4. A single continuously laterally concavely curved and vertically convexly curved optical projection screen forming the major projection area, the said curved surfaces of which face the observer, for use with a kinematograph projector, television or other apparatus for optically projecting animated pictures or images, wherein the maximum depth of curvature at the middle of the top or bottom of said screen lies between 1/8 and 1/5 of the length measured directly between the ends of the curved portion of the screen to ensure the creation of depth and solidity simulating a stereoscopic effect in the projected picture, and to avoid or reduce any impression of distortion of the projected picture or image and consequent eyestrain, irrespective of the position from which said picture or image is viewed by the observer.

5. A screen for optical projection purposes, according to claim 4, made of flexible material and secured in a frame structure having only the top and bottom members thereof curved laterally by connectors permitting tensioning and accommodation of the screen in all directions to impart the required curvature to the screen.

HENRY CHARLES MAHONEY.